(12) United States Patent
Karimelahi et al.

(10) Patent No.: US 10,935,723 B2
(45) Date of Patent: Mar. 2, 2021

(54) SURFACE GRATINGS, PHOTONICS CIRCUIT, AND METHOD FOR WAFER-LEVEL TESTING THEREOF

(71) Applicant: INPHI CORPORATION, Santa Clara, CA (US)

(72) Inventors: Samira Karimelahi, Santa Clara, CA (US); Masaki Kato, Palo Alto, CA (US)

(73) Assignee: INPHI CORPORATION, San Jose, CA (US)

( * ) Notice: Subject to any disclaimer, the term of this patent is extended or adjusted under 35 U.S.C. 154(b) by 95 days.

(21) Appl. No.: 16/440,814

(22) Filed: Jun. 13, 2019

(65) Prior Publication Data

US 2019/0310418 A1    Oct. 10, 2019

Related U.S. Application Data

(63) Continuation of application No. 15/788,553, filed on Oct. 19, 2017, now Pat. No. 10,365,435.

(51) Int. Cl.
| | |
|---|---|
| *G02B 6/126* | (2006.01) |
| *G02B 6/124* | (2006.01) |
| *G02B 6/125* | (2006.01) |
| *G02B 6/27* | (2006.01) |
| *G02B 6/122* | (2006.01) |
| *G02B 6/30* | (2006.01) |

(Continued)

(52) U.S. Cl.
CPC ............. *G02B 6/124* (2013.01); *G01M 11/33* (2013.01); *G01M 11/35* (2013.01); *G02B 6/125* (2013.01); *G02B 6/126* (2013.01); *G02B 6/1228* (2013.01); *G02B 6/2726* (2013.01); *G02B 6/2773* (2013.01); *G02B 6/305* (2013.01); *G02B 6/34* (2013.01); *G02B 2006/12061* (2013.01)

(58) Field of Classification Search
CPC ...... G02B 6/124; G02B 6/2773; G02B 6/305; G02B 6/2726; G02B 6/126; G02B 6/125; G02B 6/1228; G02B 2006/12061; G01M 11/33; G01M 11/35
See application file for complete search history.

(56) References Cited

U.S. PATENT DOCUMENTS

| | | | |
|---|---|---|---|
| 2004/0184156 A1* | 9/2004 | Gunn, III | G02B 6/124 359/629 |
| 2010/0119229 A1* | 5/2010 | Roelkens | G02B 6/34 398/79 |
| 2017/0138789 A1* | 5/2017 | Ivanov | G02B 6/305 |

* cited by examiner

*Primary Examiner* — Tony Ko
(74) *Attorney, Agent, or Firm* — Richard T. Ogawa; Ogawa P.C.

(57) ABSTRACT

A surface grating coupler for polarization splitting or diverse includes a planar layer and an array of scattering elements arranged in the planar layer at intersections of a first set of concentric elliptical curves crossing with a second set of concentric elliptical curves rotated proximately 90 or 180 degrees to form a two-dimensional (2D) grating. Additionally, the grating coupler includes a first waveguide in double-taper shape and a second waveguide in double-taper shape respectively for split or diverse an incident light into the 2D grating into two output light to two output ports with a same (either TE or TM) polarization mode or one output port with TE polarization mode and another output port with TM polarization mode. The polarization diverse grating coupler is required to test multiple polarization sensitive photonics components and can be used with other single polarization grating coupler via a fiber array to perform wafer-level testing.

20 Claims, 11 Drawing Sheets

(51) Int. Cl.
*G01M 11/00* (2006.01)
*G02B 6/12* (2006.01)
*G02B 6/34* (2006.01)

SURFACE GRATINGS, PHOTONICS CIRCUIT, AND METHOD FOR WAFER-LEVEL TESTING THEREOF

CROSS-REFERENCE TO RELATED APPLICATIONS

This application is continuation of and claims priority to U.S. patent application Ser. No. 15/788,553, filed on Oct. 19, 2017, commonly assigned and incorporated by reference herein for all purposes.

BACKGROUND OF THE INVENTION

The present invention relates to optical communication techniques. More particularly, the present invention provides a surface gratings device for optical input/output, a wafer level integrated circuit for a photonics optical system, and method of using thereof.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Progress in computer technology (and the continuation of Moore's Law) is becoming increasingly dependent on faster data transfer between and within microchips. Optical interconnects may provide a way forward, and silicon photonics may prove particularly useful, once integrated on the standard silicon chips. Surface gratings are important form of optical input/output (IO) since they allow us to do wafer level testing which is essential for product line of making photonics systems on chips. For example, surface grating can be put in form of the array of input/outputs using the fiber array as an optical probe, multiple outputs can be measured simultaneously with only one alignment. Other forms of IO such as edge coupling, requires dicing before testing. Also, it is more time consuming as each die and component should be tested separately with a single fiber. Separate alignment is also necessary for each input and output. Additionally, surface grating can be utilized for a single polarization or as a polarization diverse component. The later can be used for measurement of the polarization sensitive components where both sources of TE and TM are launched to the wafer.

Most conventional polarization splitting gratings are able to provide polarization light in either TE or TM polarization mode to the wafer but with poor coupling efficiency. The conventional grating coupler for polarization diverse that provides both TE and TM polarization light are large in size as they cannot use focusing configuration. Therefore, an improved surface grating device with either polarization splitting or diverse function is desired to be integrated in a photonics system.

BRIEF SUMMARY OF THE INVENTION

The present invention relates to optical telecommunication techniques. More particularly, the present invention provides a surface grating for optical IO with polarization splitting or diverse function for performing wafer-level testing of an array of photonics chip components on a chip for high data rate optical communications, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a surface grating coupler for polarization splitting. The surface grating coupler includes a planar layer. Additionally, the surface grating coupler includes an array of scattering elements arranged in a portion of the planar layer at a plurality of intersections of a first set of concentric elliptical curves crossing with a second set of concentric elliptical curves rotated proximately 90 degrees to form a two-dimensional (2D) grating. The surface grating coupler further includes a first extra grating formed in the planar layer outside a first concave side of the 2D grating and a second extra grating formed in the planar layer outside a second concave side of the 2D grating. Furthermore, the surface grating coupler includes a first waveguide formed in the same planar layer connecting a first convex side of the 2D grating to a first output port, the first convex side being opposite to the first concave side. Moreover, the surface grating coupler includes a second waveguide formed in the same planar layer connecting a second convex side of the 2D grating to a second output port. The second convex side is opposite to the second concave side. Optionally, each of the first waveguide and the second waveguide is characterized by a double-taper shape.

In an alternative embodiment, the present invention provides a surface grating coupler for polarization diverse. The surface grating coupler includes a planar layer. Additionally, the surface grating coupler includes an array of scattering elements arranged in a portion of the planar layer at a plurality of intersections of a first set of concentric elliptical curves crossing with a second set of concentric elliptical curves rotated proximately 180 degrees to form a two-dimensional (2D) grating. The surface grating coupler further includes a first waveguide coupled from the first convex side of the 2D grating to a first output port. Furthermore, the surface grating coupler includes a second waveguide coupled from the second convex side of the 2D grating to a second output port, the second output port being orientated proximately 180 degrees relative to the first output port. Each of the first waveguide and the second waveguide is characterized by a double-taper shape.

In yet another embodiment, the present invention provides a method for performing wafer-level optical verification. The method includes providing an array of photonics chip devices on a substrate. Additionally, the method includes forming an array of surface grating couplers on the substrate. Each surface grating coupler includes an array of scattering elements arranged in a portion of the substrate at a plurality of intersections of a first set of concentric elliptical curves crossing with a second set of concentric elliptical curves rotated proximately 90 or 180 degrees to form a two-dimensional (2D) grating. Each surface grating coupler further includes a first waveguide coupled from the first convex side of the 2D grating to a first output port and a second waveguide coupled from the second convex side of the 2D grating to a second output port, the second output port being orientated proximately 90 or 180 degrees relative to the first output port. The method further includes coupling the first output port and the second output port respectively to one or more of input waveguides or output waveguides of at least one of the array of photonics chip devices. Furthermore, the method includes providing an array of optical fibers on top of the substrate with corresponding fiber outputs or inputs commonly aligned with an angle deviate slightly from 90 degrees relative to the substrate for respectively providing or receiving polarized light in either TE polarization mode or TM polarization mode. Moreover, the method includes performing measurement of at least some of the array of photonics chip devices or some outputs of at least one of the array of photonics chip devices simultaneously.

In an alternative embodiment, the present invention provides a wafer-level testing system. The system includes an array of devices under test (DUTs) formed in a substrate and an array of surface grating couplers formed in the same substrate. The array of surface grating couplers includes at least a polarization splitting grating coupler containing an array of scattering elements arranged in a portion of the substrate at a plurality of intersections of a first set of concentric elliptical curves crossing with a second set of concentric elliptical curves rotated proximately 90 degrees as a two-dimensional (2D) grating with the first waveguide and the second waveguide formed in the same substrate. The polarization splitting grating coupler is configured to receive an incident light from atop of the substrate via an optical fiber and to split the incident light to a first polarization light in TE (or TM) mode to the first waveguide coupled to a first output port and a second polarization light in TE (or TM) mode to the second waveguide coupled to a second output port. The system further optionally includes a polarization diverse grating coupler containing an array of scattering elements arranged in a portion of the substrate at a plurality of intersections of a first set of concentric elliptical curves crossing with a second set of concentric elliptical curves rotated proximately 180 degrees as a two-dimensional (2D) grating with the first waveguide and the second waveguide formed in the substrate. The polarization diverse grating coupler is configured to receive an incident light from atop of the substrate via an optical fiber and to diverse a first polarization light in TM (or TE) mode to the first waveguide coupled to a first output port and a second polarization light in TE (or TM) mode to the second waveguide coupled to a second output port. Optionally, the polarization diverse grating coupler is used to provide polarization optical inputs in both TM or TE mode and the polarization splitting grating coupler is used either for providing optical inputs with single polarization or detect optical outputs of the DUTs formed in the same substrate in a wafer-level testing scheme.

The present invention achieves these benefits and others in the context of known waveguide laser communication technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
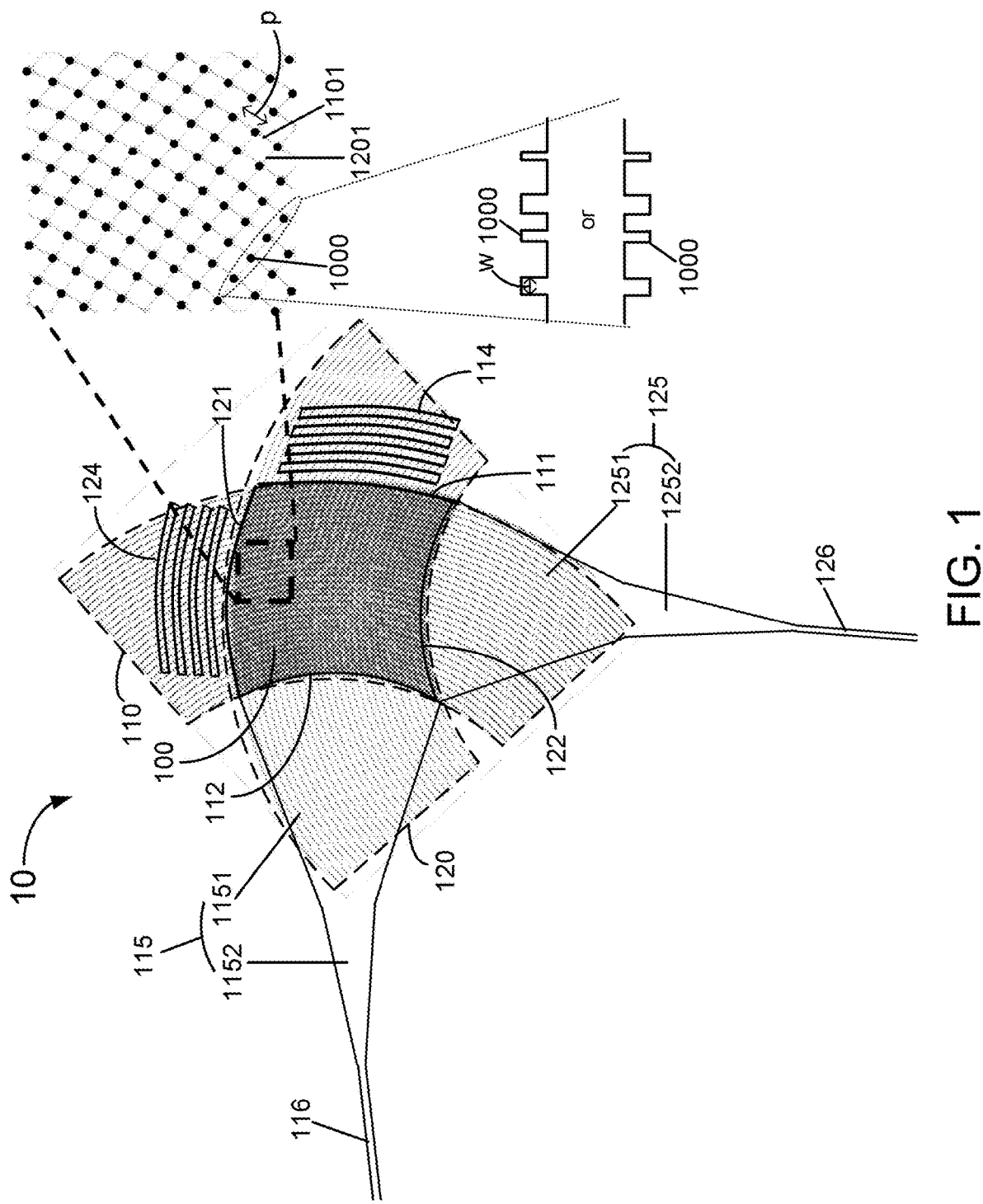
FIG. 1 is a schematic diagram of a surface grating coupler for polarization splitting according to some embodiments of the present disclosure.

The present invention relates to optical telecommunication techniques. More particularly, the present invention provides a surface grating for optical IO with polarization splitting or diverse function for performing wafer-level testing of an array of photonics chip components on chip for high data rate optical communications, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, entry, exit, clockwise and counter clockwise have been used for convenience purposes only and are not intended to imply any particular fixed direction. Instead, they are used to reflect relative locations and/or directions between various portions of an object.

In general, surface grating provides an important form of optical input/output (IO) for it allows a wafer level testing to be possible which is essential for product line manufacture of photonics chip components, module, subsystem, or system-on-chip. For example, surface grating can be put in form of the array of IOs where array of optical fibers are used as optical probe to provide incident light to the devices under test (DUTs). Multiple outputs can be measured simultaneously with only one optical alignment done on the array of optical fibers.

Other forms of optical IO such as edge coupling require wafer dicing to get individual device in each die before testing. It is more time consuming as each die and component should be tested separately with a single optical fiber. Separate alignment is necessary for each input and output.

Accordingly, the present disclosure provides, inter alia, a surface grating coupler with enhanced performance in polarization splitting grating provided TE or TM polarization to the wafer devices and a surface grating coupler providing both TE and TM polarization with focusing configuration, and array of surface grating couplers described herein integrated on photonics chip, e.g., silicon-photonics (SiPho) chip, and a method of performing wafer-level testing on the integrated SiPho chip that substantially obviate one or more of the problems due to limitations and disadvantages of the related art.

In one aspect, the present disclosure provides a surface grating coupler for polarization splitting. FIG. 1 is a schematic diagram of a surface grating coupler for polarization splitting according to some embodiments of the present disclosure. This diagram is merely an example, which should not unduly limit the scope of the claims. One of ordinary skill in the art would recognize many variations, alternatives, and modifications. Referring to FIG. 1, the surface grating coupler 10 includes a planar layer. Optionally, the planar layer may be a silicon layer on a silicon-on-insulator (SOI) substrate. Or, it is simply referred to a planar layer on a substrate. FIG. 1 is merely a top plane view of the surface grating coupler. Additionally, the surface grating coupler includes an array of scattering elements 1000 arranged in the planar layer periodically in multiple locations corresponding to intersections of a first set of concentric elliptical curves 110 crossing a second set of concentric elliptical curves 120 which is rotated proximately 90 degrees relative to the first set of concentric elliptical curves 110. Referring to an expanded view of an region of the two sets crossing elliptical curves, these elliptical curves are virtual lines without appearing in the planar layer. Optionally, each elliptical curve 110 or 120 is a section of vertical or close to vertical ellipse. Optionally, each of the first set of elliptical curves 110 and the second set of concentric elliptical curves 120 has an equal spacing p between any two adjacent elliptical curves. The spacing p provides a period for the array of scattering elements formed at the intersections, resulting in a grating period of a two-dimensional (2D) grating 100.

Referring to another expanded view in FIG. 1 of a row of scattering elements, each scattering element 1000 can be a hole into the planar layer or a pillar protruded above the planar layer. Optionally, each scattering element 1000 can have an arbitrary shape such as cylinder, cube, a pyramid, a prism or a polyhedron with a variable nominal size w. Optionally, the scattering elements 1000 are arranged in a two-dimensional array with to a variable spacing between any two adjacent scattering elements to form the 2D grating 100 while keeping the filling factor the same for different duty cycle across the grating. In a top view shown by FIG. 1, the 2D grating 100 occupies a portion of the planar layer with a first concave side 111, a second concave side 121, a first convex side 112, and a second convex side 122.

Further, the surface grating coupler 10 includes a first extra grating 114 formed in the same planar layer outside the first concave side 111 of the 2D grating 100 and a second extra grating 124 formed in the same planar layer outside the second concave side 121 of the 2D grating 100. Optionally, the first extra grating 114 includes multiple trenches formed in the planar layer in parallel to the first set of concentric elliptical curves 110. Each trench is configured to have a width and a spacing from its adjacent one of the multiple trenches. Each trench has a curvature of a vertical or close to vertical ellipse substantially the same as that of the first set of concentric elliptical curves 110. Similarly, the second extra grating 124 includes multiple trenches formed in the planar layer in parallel to the second set of concentric elliptical curves 120. Each trench is configured to have a width and a spacing from its adjacent one of the multiple trenches. Each trench has a curvature of a vertical or close to vertical ellipse substantially the same as that of the first set of concentric elliptical curves 120.

Referring to FIG. 1 again, the surface grating coupler 10 furthermore includes a first waveguide 115 formed in the planar layer and coupled from the first convex side 112 to a first output port 116 and a second waveguide 125 formed in the same planar layer and coupled from the second convex side 122 to a second output port 126. In an embodiment, each of the first waveguide 115 and the second waveguide 125 is configured to be a double-taper shape.

Figure 2:
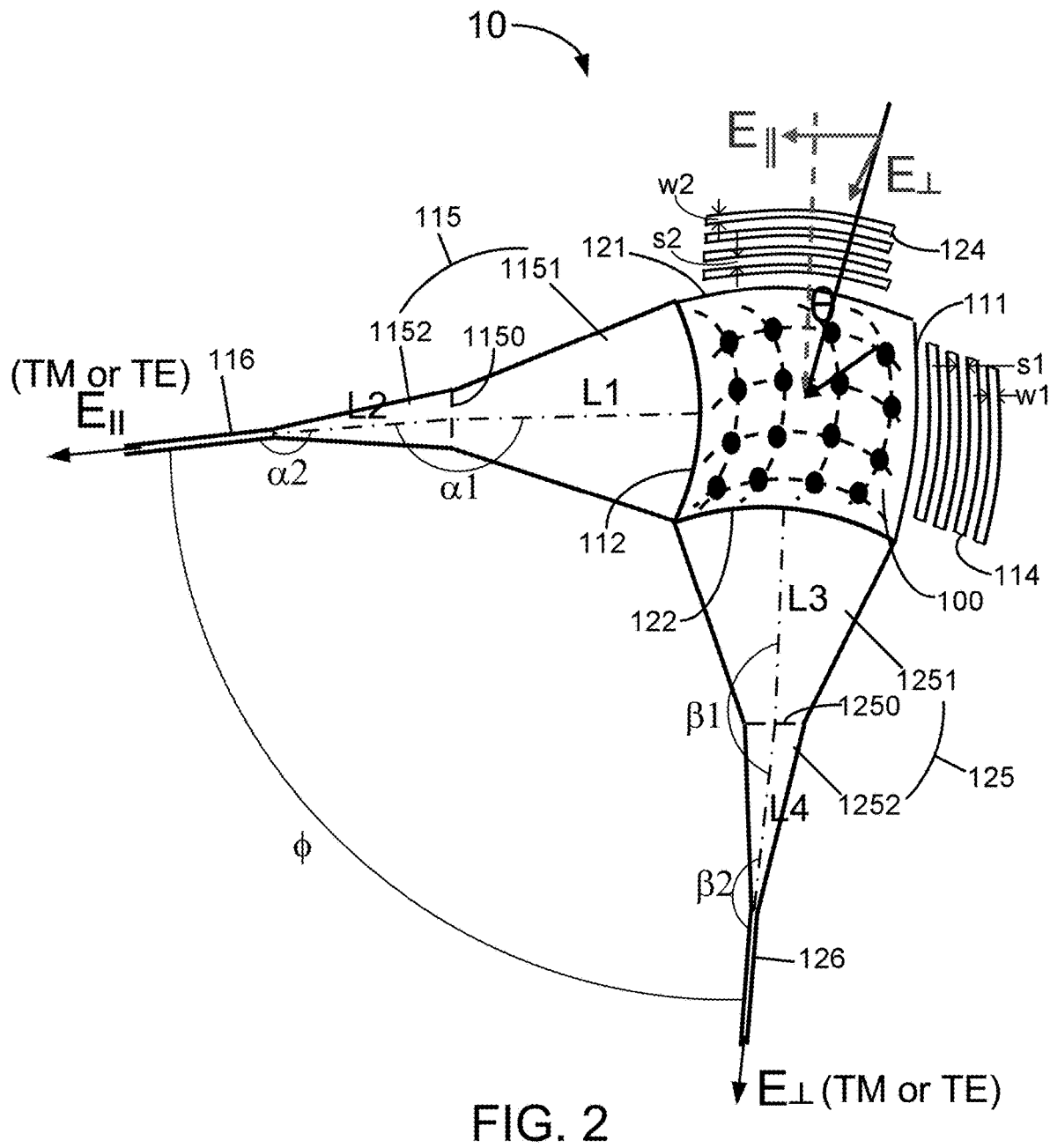
FIG. 2 is a schematic diagram of the surface grating coupler for splitting an incident light received from atop to a parallel polarization component in a first output port and an orthogonal polarization component in a second output port according to an embodiment of the present disclosure.

FIG. 2 is a schematic diagram of the surface grating coupler for splitting an incident light received from atop to a parallel polarization component in a first output port and an orthogonal polarization component in a second output port according to an embodiment of the present disclosure. This diagram is merely an example, which should not unduly limit the scope of the claims. One of ordinary skill in the art would recognize many variations, alternatives, and modifications. Referring to FIG. 2, the surface grating coupler 10 is subjected to receive an incident light, optionally provided via an optical fiber, aligned in an incident angle θ relative to a normal direction of the planar layer. Optionally, an optical fiber can be aligned with an angle deviated from the normal direction of a substrate. Therefore, the incident light is guided by the optical fiber in an angle slightly deviated from 90 degrees relative to the planar layer (i.e., a plane of substrate or a plane of grating). The deviation of the incident angle from 90 degrees relative to the planar layer results in tilted optical phase front.

The incident light is then decomposed into two polarization components, one is a parallel polarization component $E_\parallel$ and another one is an orthogonal polarization component $E_\perp$. The surface grating coupler 10 is configured to be a polarization splitting grating coupler for coupling the parallel polarization component $E_\parallel$ and the orthogonal polarization component $E_\perp$ respectively to the first output port 116 and the second output port 126 provided that corresponding phase matching conditions are fulfilled.

In an embodiment, the incident light is scattered by the array of scattering elements 1000 arranged with a grating period p of the 2D grating 100 formed in the intersections of the two sets of concentric elliptic curves 110 and 120 relatively rotated proximately 90 degrees. As the incident light is incident with an angle θ relative to normal direction of a plane of the 2D grating 100 and diffracted by the array of scattering elements 1000, the parallel polarization component $E_\parallel$ is primarily coupled towards the first convex side 112 of the 2D grating 100 and the orthogonal polarization component $E_\perp$ is primarily coupled towards the second convex side 122 of the 2D grating 100. A portion of incident light is scattered towards the first concave side 111 and the second concave side 121 of the 2D grating 100.

Referring to FIG. 2, the first extra grating 114 disposed outside the first concave side 111 includes several trenches, or in general 1D gratings, with continuous curve length close to that of the first concave side 111 in a substantially same curvature of the first set of concentric elliptic curves 110. Each of the several 1D gratings has a width w1 and a spacing s1 relative to its neighboring trench. Optionally, w1 or s1 is proximately the same as the grating period p of the 2D grating 100. Similarly, the second extra grating 124 disposed outside includes several trenches the second concave side 121 with continuous curve length close to that of the second concave side 121 in a substantially same curvature of the second set of concentric elliptic curves 120. Each of the several 1D gratings has a width w2 and a spacing s2 relative to its neighboring trench. Optionally, w2 or s2 is proximately the same as the grating period p of the 2D grating 100. Each of the first extra grating 114 and the second extra grating 124 is configured in a form of focusing grating to recollect light outgoing towards both the first concave side 111 and the second concave side 121 and feed the light back to the first convex side 112 and the second convex side respectively, enhancing the coupling efficiency of the surface grating coupler 10.

In the embodiment, the surface grating coupler also includes the first waveguide 115 and the second waveguide 125 each configured as a double-taper structure which is optimized to provide maximum coupling efficiency of transmitting the parallel polarization component $E_\parallel$ to the first output port 116 and transmitting the orthogonal polarization component $E_\perp$ to the second output port 126. Referring to FIG. 2, the first waveguide 115 includes a first taper section 1151 with a reducing first width from the first convex side 112 to a first joint 1150 over a first length L1 along a first nominal direction and a second taper section 1152 with a reducing second width from the first joint 1150 to the first output port 116 over a second length L2 along a second nominal direction. Similarly, the second waveguide 125 includes a third taper section 1251 with a reducing third width from the second convex side 122 to a second joint 1250 over a third length L3 along a third nominal direction and a fourth taper section 1252 with a reducing fourth width from the second joint 1250 to the second output port 126 over a fourth length L4 along a fourth nominal direction. In the embodiment, the nominal direction is substantially along a bisector line of the waveguide. The first nominal direction is along a first bisector line of the first taper section 1151 and the second nominal direction is along a second bisector line of the second taper section 1152. Optionally, an angle α1 between the second nominal direction and the first nominal direction is close to but not limited to 180 degrees. Optionally, an angle α2 between the first output port 116 and the second nominal direction is close to but not limited to 180 degrees. Optionally, an angle β1 between the fourth nominal direction and the third nominal direction is close to but not limited to 180 degrees. Optionally, an angle β2 between the second output port 126 and the fourth nominal direction is close to but not limited to 180 degrees. Optionally, an angle φ between the first output port 116 and the second output port 126 is an arbitrary angle offset from 90 degrees depended on the incident angle θ relative to normal of the plane of the 2D grating 100.

In the embodiment, all characterizing parameters of the double-taper structure for either the first waveguide 115 or the second waveguide 125 including lengths L1, L2, L3, and L4, first width, second width, third width, and fourth width, angles α1, α2, β1, and β2 can be selected to optimize the transmission of a portion of incident light with a parallel polarization to the first output port 116 with minimum insertion loss and another portion of incident light with an orthogonal polarization to the second output port 126 with minimum insertion loss. In an embodiment, the light coupled into the first output port 116 is substantially in transverse magnetic (TM) [or transverse electric (TE)] mode corresponding to the parallel polarization component $E_\parallel$ and the light coupled into the second output port 126 is also substantially in TM (or TE) mode corresponding to orthogonal polarization component $E_\perp$. The double-taper structure is configured to help guiding the light to the output port with enhanced coupling efficiency even if the angle of propagation constant varies and the focal point of the scattered light varies due to various factors such as fabrication variation, fiber optic position offset from optimum position, or others. In an embodiment, each of the first output port 116 and the second output port 126 is configured to be located at the focal points of corresponding first set of concentric elliptical curves 110 and the second set of concentric elliptical curves 120.

Figure 3:
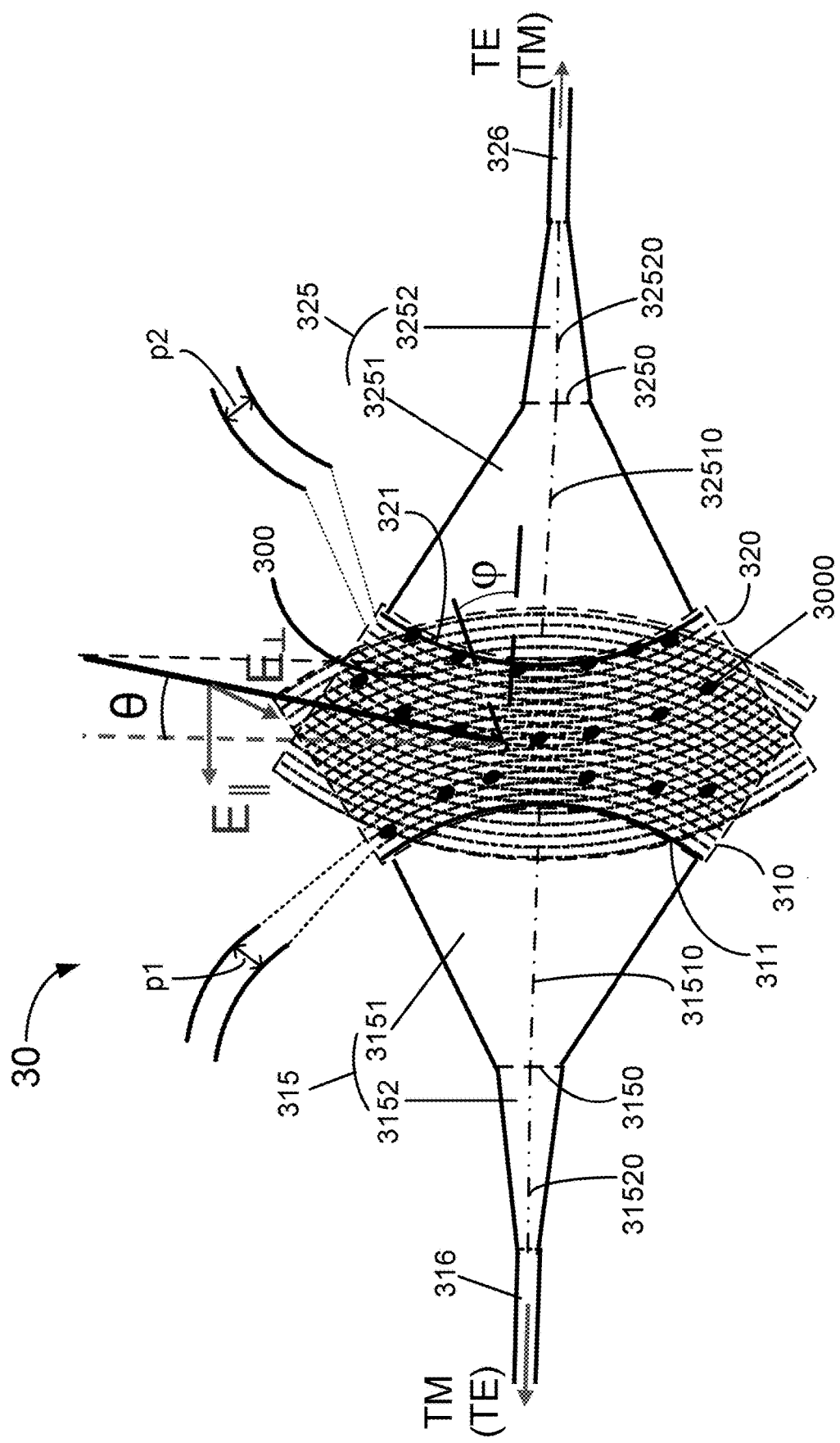
FIG. 3 is a schematic diagram of a surface grating coupler for polarization diverse according to some embodiments of the present disclosure.

In an alternative embodiment, the present disclosure provides a polarization diverse grating coupler configured to phase match the parallel polarization component of incident light to a transverse magnetic (TM) mode coupled into a first output waveguide and the orthogonal polarization component of incident light to a transverse electric (TE) mode coupled into a second output waveguide. FIG. 3 is schematic diagram of a surface grating coupler for polarization diverse according to some embodiments of the present disclosure. This diagram is merely an example, which should not unduly limit the scope of the claims. One of ordinary skill in the art would recognize many variations, alternatives, and modifications. As shown, the surface granting coupler 30 includes a planar layer of silicon of a SOI substrate which may be the same substrate for forming an array of photonics chip components. The surface grating coupler 30 further includes an array of scattering elements 3000 configured in a periodic order to form a 2D grating 300. The scattering elements 3000 of the 2D grating are located at intersections of two sets of concentric elliptical curves rotated proximately 180 degrees with respect to each other. A first set of concentric elliptical curves 310 has a first pitch p1. Each elliptical curve 310 is a section of vertical or close to vertical ellipse so that the first set of concentric elliptical curves 310 forms a focus grating with a first grating period p1. A second set of concentric elliptical curves 320 has a second pitch p2. Each elliptical curve 320 is a section of vertical or close to vertical ellipse to form a focus grating with a second grating period p2.

Optionally, these elliptical curves can be virtual curves without actually appearing in the planar layer except that at the locations of their intersections holes or pillars of any shape are formed to be configured as the array of scattering elements 3000 configured as the 2D grating 300. As viewed from atop (FIG. 3), the 2D grating 300 has two major boundaries, i.e., a first convex side 311 and a second convex side 321.

Additionally, the surface granting coupler 30 includes a first waveguide 315 coupled from the first convex side 311 of the 2D grating 300 to a first output waveguide 316 and a second waveguide 325 coupled from the second convex side 321 of the 2D grating 300 to a second output waveguide 326. The second output waveguide 326 is orientated proximately 180 degrees with respect to the first output waveguide 316. Each of the first waveguide 315 and the second waveguide 325 is characterized by a double-taper shaped structure. Optionally, the double-taper shaped structure includes a first taper section 3151 (3251) with a reducing first width from the first (second) convex side 311 (321) to a first (second) joint 3150 (3250) over a first length along a first bisector 31510 (32510) of the first taper section 3151 (3251) and a second taper section 3152 (3252) with a reducing second width from the first (second) joint 3150 (3250) to the first (second) output waveguide 316 (326) over a second length along a second bisector 31520 (32520) of the second taper section 3152 (3252).

Figure 4:
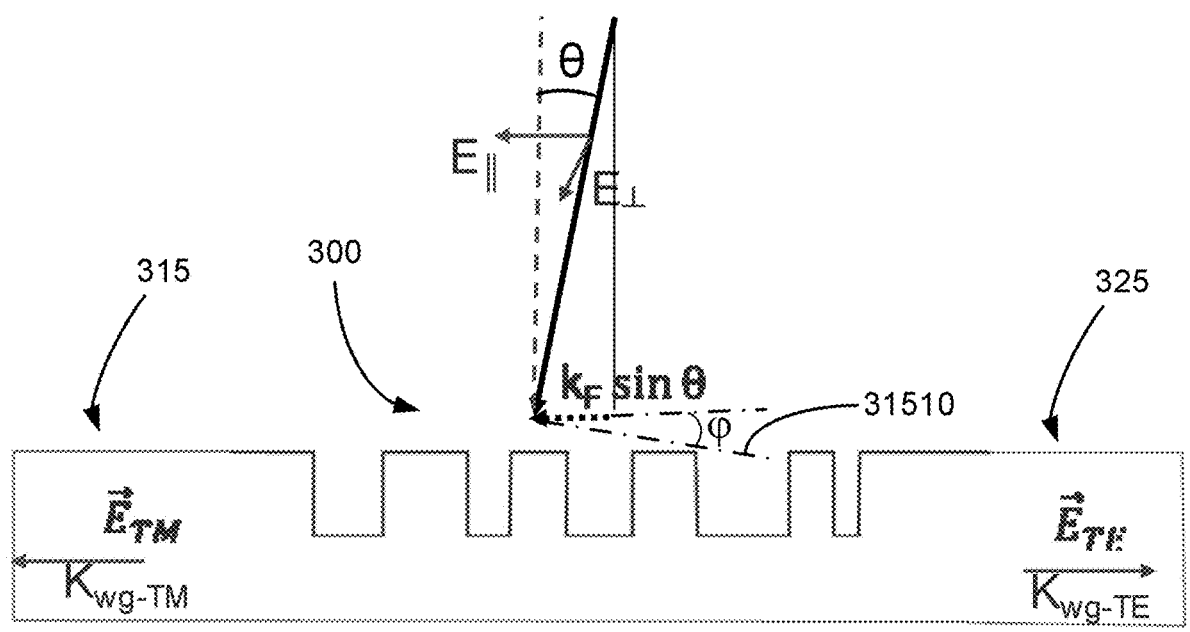
FIG. 4 is a schematic diagram showing an incident beam deviated slightly from 90 degrees relative to a grating plane of the surface grating coupler of FIG. 3 to diverse a polarization light in TM (or TE) mode to a first output port and a polarization light in TE (or TM) mode to a second output port in opposite direction according to an embodiment of the present disclosure.

FIG. 4 is a schematic diagram showing that a light beam is guided from atop of the planar layer with an angle θ deviated from 90 degrees, it is decomposed as a parallel polarization component $E_\parallel$ and an orthogonal polarization component $E_\perp$. As the light beam is incident to the 2D grating 300, it is diffracted by the array of scattering elements 3000 located at the intersections of the first set of concentric ellipses 310 and the second set of ellipses 320 rotated approximately 180 degrees with respect to each other. The diffractions result in phase match of the parallel polarization component $E_\parallel$ to a transverse magnetic (TM) mode in a first waveguide 315 and the orthogonal polarization component $E_\perp$ to a transverse electric (TE) mode in a second waveguide 325 in substantially opposite direction (i.e., 180 degrees with respect to each other). All structural parameters associated with the double-taper shape of the first waveguide 315 and the second waveguide 325 can be optimized in terms of achieving a minimum insertion loss of transmitting a parallel polarization component $E_\parallel$ and an orthogonal polarization component $E_\perp$ of the incident light with an incident angle deviated from normal of the planar layer respectively to the first output waveguide 316 and the second output waveguide 326.

In the embodiment, the grating period of the 2D grating 300 can be optimized independently for the best phase matching in each of the two output waveguides respectively for TE mode and TM mode. Optionally, the first set of concentric elliptical curves 310 is optimized with its first pitch p1 equal to a grating period $\Lambda_{TM}$ for maximizing coupling efficiency to incorporate the parallel polarization component $E_\parallel$ into the first waveguide 315 substantially in TM mode and the second set of concentric elliptical curves 320 is optimized with its second pitch p2 equal to a grating period $\Lambda_{TE}$ for maximizing coupling efficiency to incorporate the orthogonal polarization component $E_\perp$ into the second waveguide 325 substantially in TE mode. A following phase matching relationship is fulfilled:

$$\pm n_f \sin\theta + \frac{\lambda}{\Lambda_{TM,TE}} = n_{eff(TM,TE)}$$

$n_f$ is the effective refractive index of fiber mode (of the optical fiber for guiding the incident light). θ is the angle of incident to the normal of the plane of 2D grating. λ is the input wavelength. $\Lambda_{TM}$ and $\Lambda_{TE}$ are the grating period for TM and TE modes. $n_{eff(TM,TE)}$ are the effective refractive indices of TM and TE grating modes. The negative sign of sine is corresponding to the output where the angle of fiber wave vector and the plane of grating is less than 90 degree. In the example, this will be for TE mode. In general, TE and TM mode output directions could be reversed.

In the embodiment, the design of focusing grating of the 2D grating 300 in both directions helps to decrease a size of the 2D grating 300 as well as a total size of the surface grating coupler 30. The focal length of each grating can be designed separately.

In the embodiment, the positive and negative sign of the sine result in that the polarization light in TM mode coupled in one of two output waveguides (316 and 326) has a preferred entrance point to be at the farther focal point of the corresponding set of concentric elliptical curves (310 or 320) and the polarization light in TE mode coupled in another of the two output waveguides has a preferred entrance point at the closest focal point of the corresponding set of concentric elliptical curves. This can be represented by the following formula:

$$r_{TM,TE} = \frac{m\lambda}{n_{eff(TM,TE)} \pm \sin\theta\cos\varphi \cdot n_f}$$

$r_{TM,TE}$ is radius of curvature of the corresponding set of concentric elliptical curves. m is an integer. φ is the angle of projection of incident light wave vector on the plane of grating with respect to the bisector of the corresponding taper of the first or second waveguide (315 or 325).

In another aspect, the present disclosure provides a method for performing wafer-level optical verification. The method includes providing an array of photonics chip devices on a substrate. In particular, this method is associated with manufacturing integrated photonics modules or components and can be applied for performing testing for performance verification directly on wafer without dicing to obtain individual module or component at each die. Optionally, most integrated photonics modules or components are formed in a silicon layer on a silicon-on-insulator (SOI) substrate. The method further includes forming an array of surface grating couplers in the silicon layer on the SOI substrate. Each surface grating coupler optionally can be a polarization splitting grating coupler described in FIG. 1 above or polarization diverse grating coupler described in FIG. 3 above or a combination of both. Optionally, the surface grating coupler includes an array of scattering elements arranged in a portion of the SOI substrate at a plurality of intersections of a first set of concentric elliptical curves crossing with a second set of concentric elliptical curves rotated proximately 90 or 180 degrees to form a two-dimensional (2D) grating. Further, the surface grating coupler includes a first waveguide coupled from the first convex side of the 2D grating to a first output port and a second waveguide coupled from the second convex side of the 2D grating to a second output port, the second output port being orientated proximately 90 or 180 degrees relative to the first output port. Additionally, the method includes coupling the first output port and the second output port respectively to one or more of waveguide input/output ports of at least one of the array of photonics chip devices. Furthermore, the method includes providing an array of optical fibers on top of the substrate with corresponding fiber output/input ports commonly aligned with an angle deviate from normal of the substrate for respectively providing or receiving polarized light in either TE polarization mode or TM polarization mode. Moreover, the method includes performing measurement of at least some of the array of photonics chip devices or some outputs of at least one of the array of photonics chip devices simultaneously.

Figure 5:
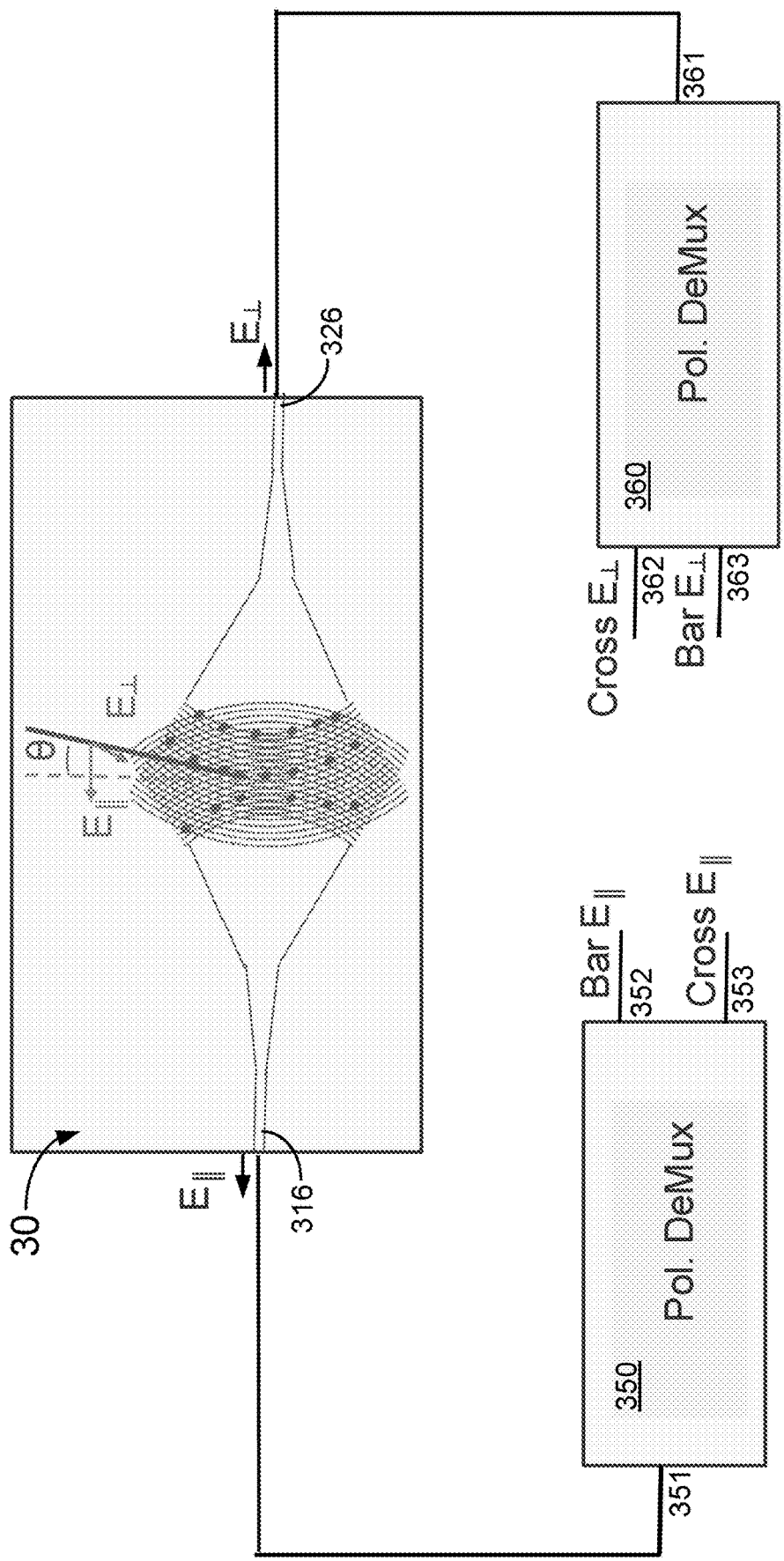
FIG. 5 is a plane view of a surface grating coupler of FIG. 3 for performing wafer-level testing of two polarization DeMux devices formed in the same substrate according to an embodiment of the present disclosure.

FIG. 5 shows an example of implementing a polarization diverse grating coupler for testing polarization DeMux component. As shown, the polarization diverse grating coupler is substantially the same as the surface grating coupler 30 of FIG. 3 and is formed in a layer of material, e.g., silicon, on a substrate shared by the two polarization DeMux components. A first output waveguide 316 of the surface grating coupler 30 guides a TM polarization light to an input port 351 of a first polarization DeMux 350 which has two output ports: a Bar port 352 and a Cross port 353. A second output waveguide 326 of the surface grating coupler 30 guides a TE polarization light to an input port 361 of a second polarization DeMux 360 which has two output ports: a Bar port 362 and a Cross port 363. Optionally, the two polarization DeMux components belong to an array of polarization DeMux devices formed on a SOI wafer and the polarization diverse grating coupler is one of array of surface grating couplers formed on the same wafer. The above testing scheme shown in FIG. 5 can be expanded to entire wafer and all input light signals can be provided by array of optical fibers with a single alignment respectively disposed on top of the array of surface grating couplers thereof so that a wafer-level testing can be performed simultaneously with single optical alignment.

Figure 6:
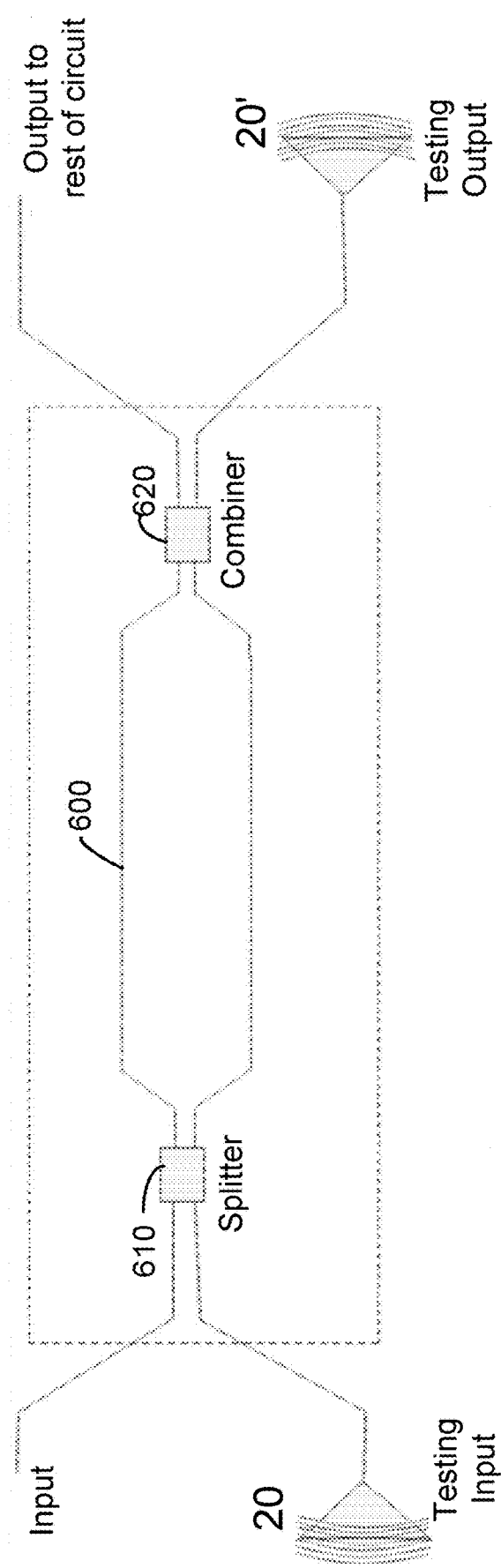
FIG. 6 is a plane view of a layout of using the surface grating coupler of FIG. 1 to provide optical performance verification of a Mach-Zehnder modulator according to an embodiment of the present disclosure.

FIG. 6 shows an example of using surface grating for performing verification testing of Mach-Zehnder modulator. In the example, the Mach-Zehnder modulator 600 can be one of an array of photonics chip components. Optionally, these photonics chip components are formed on a SOI substrate. Two surface grating couplers are added and formed on the same SOI substrate to provide an extra optical IO to ease the wafer-level verification of the Mach-Zehnder modulator 600. A first surface grating coupler 20 is a single polarization grating coupler disposed with its output waveguide connected to one input port of a 2×2 splitter 610 as a testing input to provide light in single polarization mode as a testing signal. Another input port of the 2×2 splitter 610 is for regular input signal. Additionally, a second surface grating coupler 20' is substantially the same as the first surface grating coupler 20 as a single polarization grating coupler that can couple either TE or TM mode light. The second surface grating coupler 20' has its output waveguide connected to one output port of a 2×2 combiner 620 as a testing output to receive testing signal in the single polarization mode. Another output port of the 2×2 combiner 620 is connected to rest of circuit. In this example, the surface grating coupler is either used to provide optical input and/or collect optical output from the wafer components.

Figure 7A:
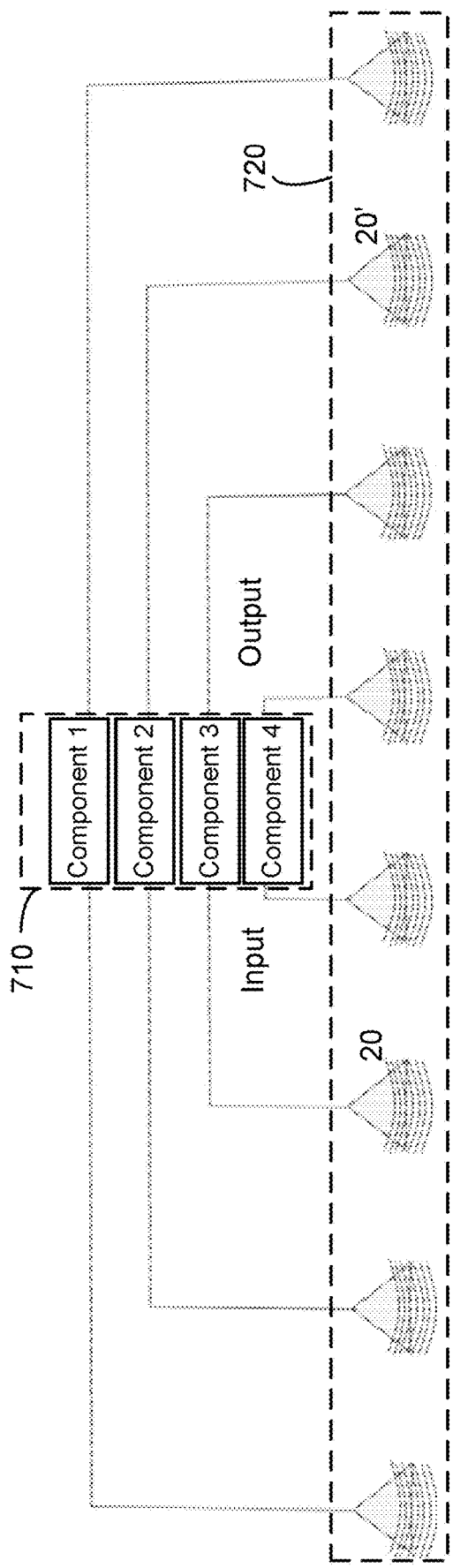
FIG. 7A and FIG. 7B are exemplary plane views of an array of photonics chip components under a wafer-level testing using an array of surface grating couplers formed in the same substrate according to some embodiments of the present disclosure.

FIG. 7A shows a simplified diagram having an array of photonics chip components 710 arranged in series: component 1, component 2, component 3, component 4, and so on, on a same wafer level. At the same time, an array of surface grating couplers 720 are provided on the same wafer level to ease the wafer level testing and verification. In particular, the array of surface grating couplers 720 includes some of surface grating couplers 20 disposed thereof for providing optical inputs to respective photonics chip components and some of surface grating couplers 20' disposed thereof for collecting optical outputs from respective photonics chip components.

Figure 7B:
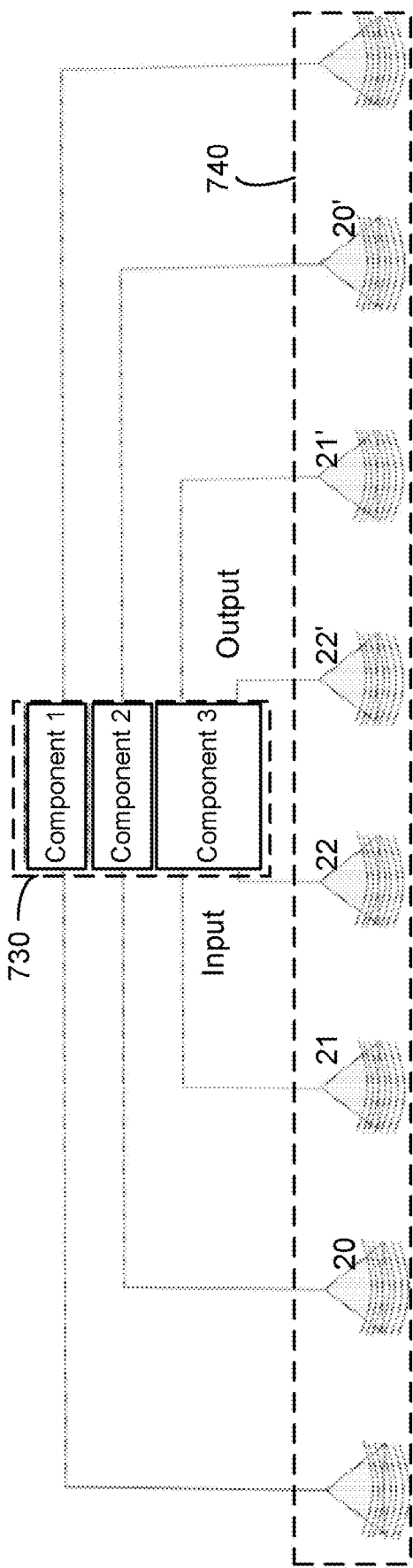

FIG. 7B shows another simplified diagram having an array of photonics chip components 730 arranged in series: component 1, component 2, component 3, and so on, on a same wafer level. An array of surface grating couplers 740 are provided on the same wafer level to ease the wafer level testing and verification. In particular, the array of surface grating couplers 740 includes some of surface grating couplers 20 disposed thereof for providing optical inputs to respective photonics chip components and some of surface grating couplers 20' disposed thereof for collecting optical outputs from respective photonics chip components. Further, for certain component, for example component 3, two surface grating couplers 21 and 22 are coupled to provide two optical inputs and two other surface grating couplers 21' and 22' are coupled to collect two optical outputs.

Figure 8:
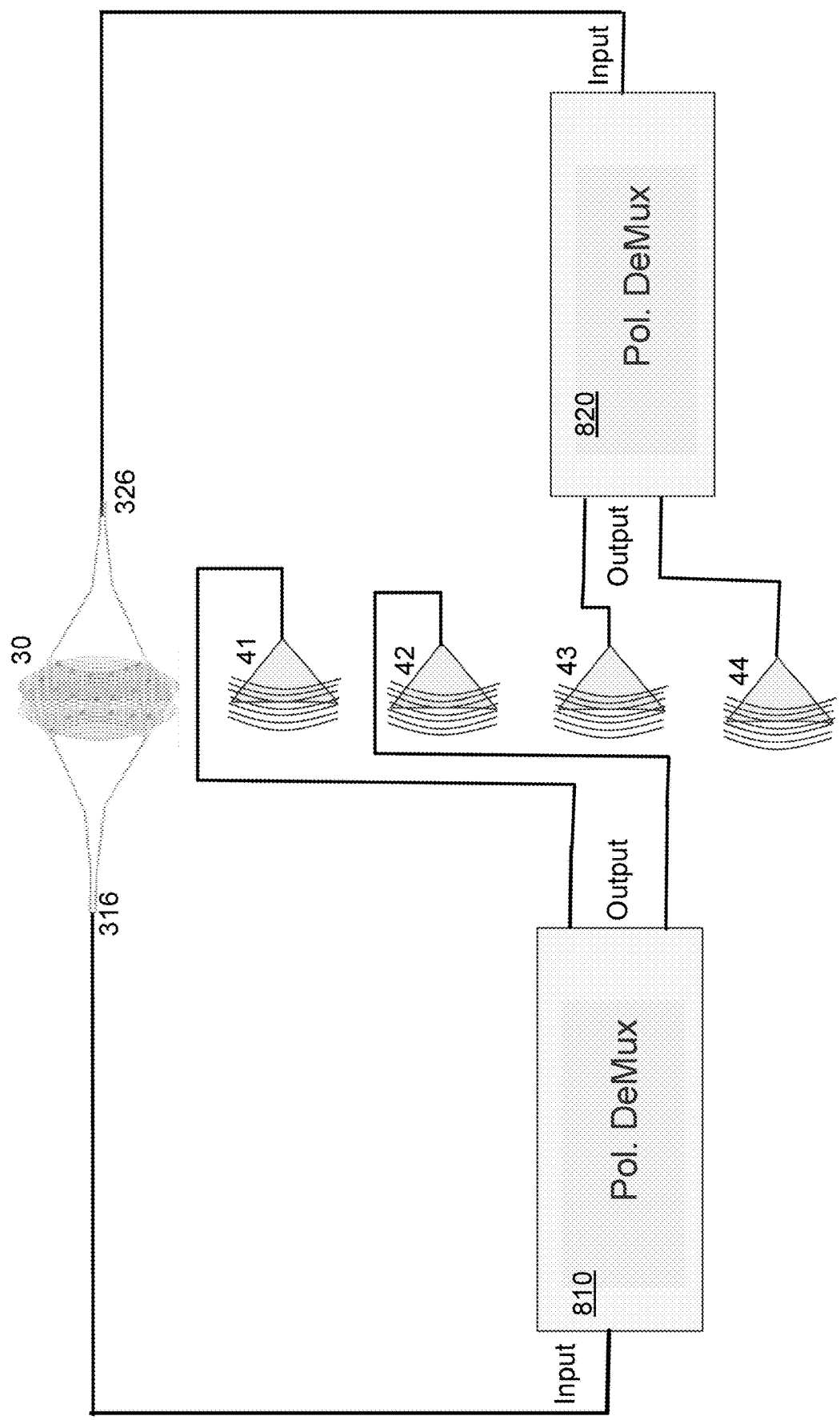
FIG. 8 is a plane view of a surface grating coupler of FIG. 3 for providing optical inputs and several surface grating couplers of FIG. 1 for detecting optical outputs to test two polarization DeMux devices formed in the same substrate according to an embodiment of the present disclosure.

In another example shown in FIG. 8, a polarization diverse grating coupler 30 is disposed to provide two optical inputs with one TM polarization mode and one TE polarization mode respectively to two polarization DeMux components 810 and 820 under testing while at the same setting, several surface grating couplers (41, 42, 43, and 44) are provided for collecting single polarization light from outputs of the two polarization DeMux components 810 and 820 under testing using a fiber array to input and collect light. For example, an input port of a first polarization DeMux component 810 receives a TM polarization light from a first output waveguide 316 of the polarization diverse grating coupler 30 and an input of a second polarization DeMux component 820 receives a TE polarization light from a second output waveguide 326 of the polarization diverse grating coupler 30. Each of the two polarization DeMux components actually only handles single polarization signals. At the output side of each polarization DeMux component, two surface grating couplers are disposed to collect single polarization light outputted respectively from a bar port and a cross port. For example, the surface grating couplers 41 and 42 are used to collect TM polarization light outputted from the first polarization DeMux component 810 and the surface grating couplers 43 and 44 are used to collect TE polarization light outputted from the second polarization DeMux component 820.

Figure 9:
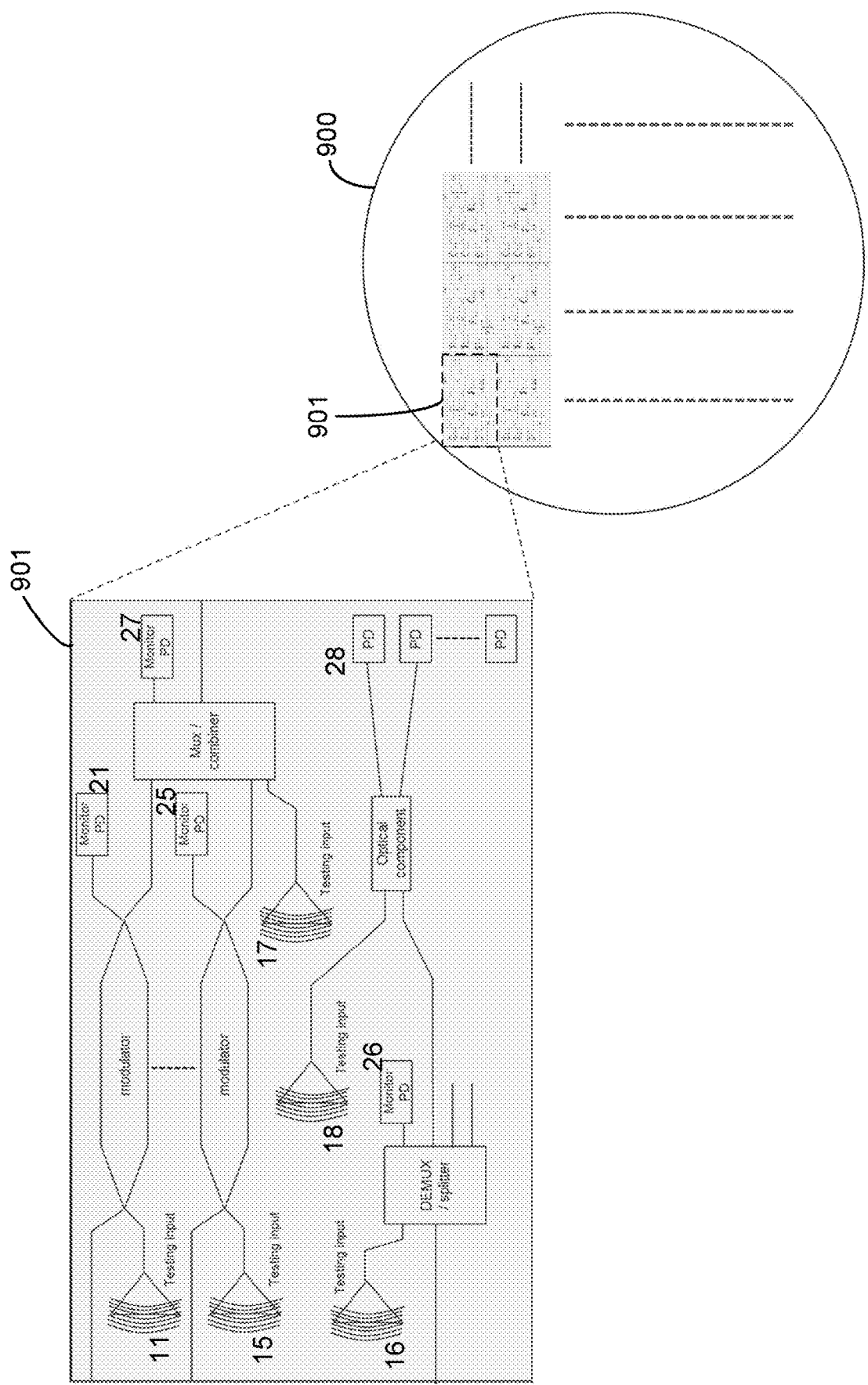
FIG. 9 is a plane view of a layout of wafer-level testing of an array of integrated silicon-photonics modules using the surface grating couplers of FIG. 1 and monitor PDs according to some embodiments of the present disclosure.

In an alternative embodiment, the method of using surface grating couplers for performing wafer level testing is implemented using the surface grating couplers for providing optical testing inputs combined with using monitor photodiodes (PDs) for collecting electrical currents in response to the optical testing inputs. FIG. 9 shows a simplified layout for performing wafer-level integrated circuit testing using grating couplers and monitor PDs according to some embodiments of the present disclosure. This diagram is merely an example, which should not unduly limit the scope of the claims. One of ordinary skill in the art would recognize many variations, alternatives, and modifications. As shown, a plurality of integrated silicon-photonics (SiPho) optical modules are manufactured on a single wafer 900 respectively distributed in a plurality of dies arranged in columns and rows. Each integrated SiPho optical module 901 in each die is shown in more details in an expanded view, including at least several modulators, a Mux/combiner component, a DeMux/splitter component, and a functional optical component. Accordingly, the method of performing wafer-level testing includes adding several surface grating couplers (11, . . . , 15) respectively to couple with the several modulators to provide extra testing inputs and adding several monitor PDs (21, . . . , 25) respectively at extra output ports of the several modulators to detect corresponding testing current signals. Additionally, the method includes add another surface grating coupler 16 to couple with the DeMux/splitter component to provide a testing input and a corresponding monitor PD 26 to detect testing current signal. Further, the method includes adding a surface grating coupler 17 to couple with the Mux/combiner component to provide a testing input and a monitor PD 27 to detect a current signal in association with the testing input. Moreover, the method includes adding a surface grating coupler 18 for supplying a testing input to the functional optical component which has a plurality of built-in PDs for detecting multiple current signals in association with at least the testing input. As integrating monitor PDs to wafer level integrated SiPho optical module is easier and cheaper than integrating light source thereon, the method provided above is advantageously to couple light from fiber-based light source through grating couplers into each corresponding components of the integrated SiPho optical module, which enables full-scale wafer-level testing on photonic integrated circuit.

Figure 10A:
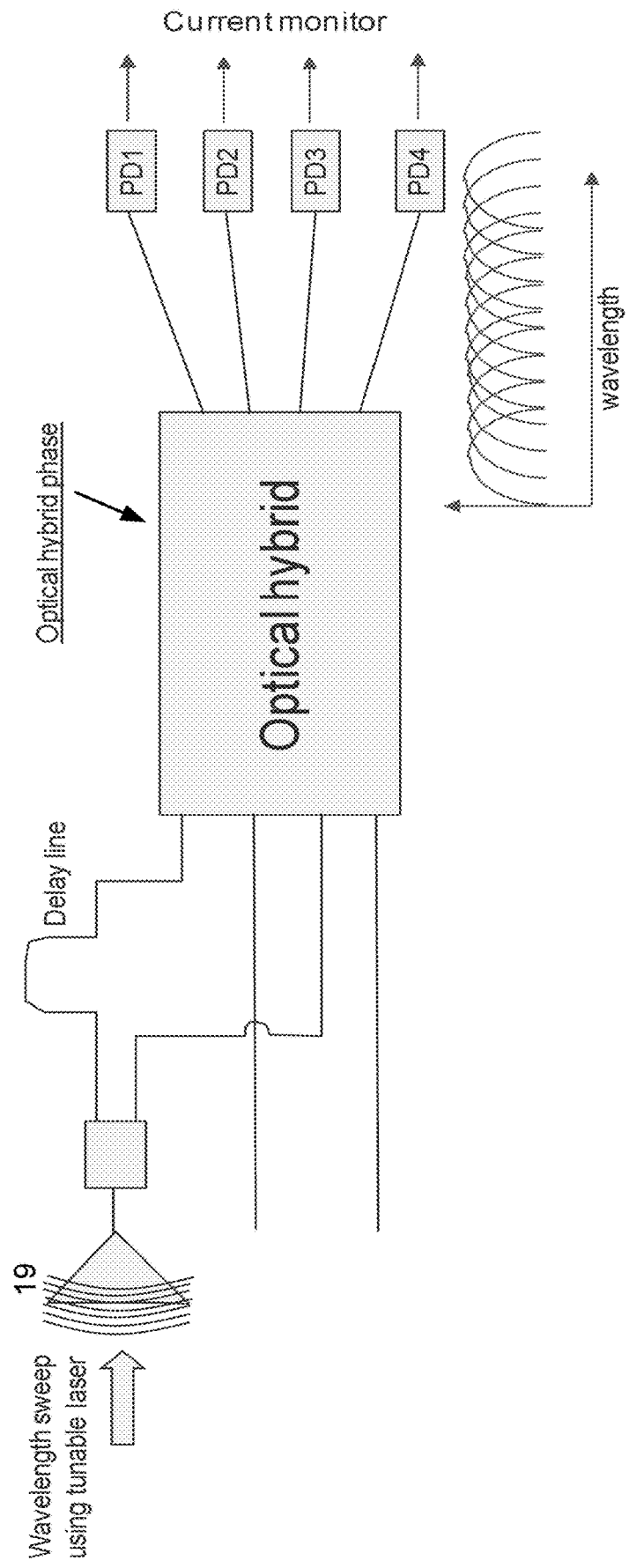
FIG. 10A is an exemplary testing layout of using a grating coupler receiving variable optical signals from a tunable laser for testing an optical hybrid phase modulator with multiple photodiodes according to an embodiment of the present disclosure.

FIG. 10A shows an example of using the grating coupler and PD for performing wafer level testing, which involves a surface grating coupler 19 configured to receive a light signal from a tunable laser source and multiple PDs coupled to an optical hybrid module to detect various current signals. Optionally, the surface grating coupler 19 is a simple surface grating coupler capable of coupling single polarization light of either TE or TM mode. The tunable laser source is able to sweep wide range of wavelengths to flexibly provide various light signals with different peak wavelengths as testing inputs. Accordingly, for each testing input with a particular peak wavelength in a single polarization mode is supplied, via a 1×2 splitter and an optical delay line based phase modulator, to the optical hybrid module, at least one PD is able to detect corresponding current signal associated with the testing input so as to perform optical performance verification at the particular peak wavelength. As a different testing input is supplied with a different peak wavelength, a different PD may be able to detect the corresponding current.

Figure 10B:
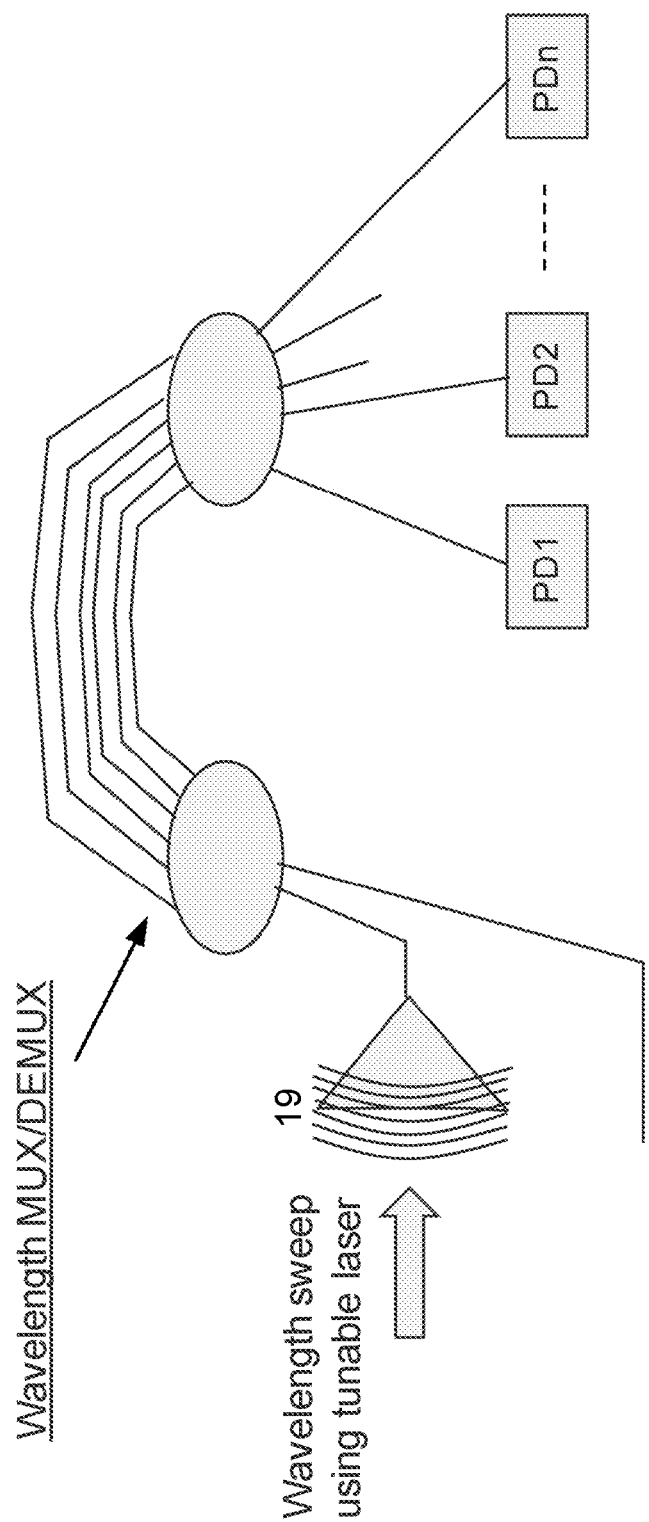
FIG. 10B is an exemplary testing layout of using a grating coupler receiving variable optical signals from a tunable laser for testing a wavelength Mux/DeMux device with multiple photodiodes according to an embodiment of the present disclosure.

FIG. 10B shows another example of using the surface grating coupler and PD to perform wafer level testing of a multi-wavelength Mux/DeMux device. Again, a surface grating coupler 19 simple surface grating coupler for providing single polarization grating. A tunable laser source is used as a light source coupled through a fiber to provide incident light to the surface grating coupler 19 so that the incident light has a variable peak wavelength. After the incident light passing through the surface grating coupler 19 a single polarization light is generated and provided as an extra testing input to the wavelength Mux/DeMux device. Optionally, the variable peak wavelength covers all channels associated with the wavelength Mux/DeMux device. Additionally, a plurality of photodiodes with different wavelength sensitive ranges designed in corresponding channels of the wavelength Mux/DeMux device are coupled to multiple output ports of the wavelength Mux/DeMux device. Therefore, the wavelength Mux/DeMux device can be conveniently tested for every channel under a single testing input with a single alignment.

In yet another aspect, the present disclosure provides a wafer-level testing system. The system includes an array of devices under test (DUTs) formed in a substrate and an array of surface grating couplers formed in the same substrate. The array of surface grating couplers includes at least a polarization splitting grating coupler containing an array of scattering elements arranged in a portion of the substrate at a plurality of intersections of a first set of concentric elliptical curves crossing with a second set of concentric elliptical curves rotated proximately 90 degrees as a two-dimensional (2D) grating with the first waveguide and the second waveguide formed in the same substrate. The polarization splitting grating coupler is configured to receive an incident light from atop of the substrate via an optical fiber and to split the incident light to a first polarization light in TE mode to the first waveguide coupled to a first output port and a second polarization light in TE mode to the second waveguide coupled to a second output port. The system further optionally includes a polarization diverse grating coupler containing an array of scattering elements arranged in a portion of the substrate at a plurality of intersections of a first set of concentric elliptical curves crossing with a second set of concentric elliptical curves rotated proximately 180 degrees as a two-dimensional (2D) grating with the first waveguide and the second waveguide formed in the substrate. The polarization diverse grating coupler is configured to receive an incident light from atop of the substrate via an optical fiber and to diverse a first polarization light in TM mode to the first waveguide coupled to a first output port and a second polarization light in TE mode to the second waveguide coupled to a second output port. Optionally, the polarization diverse grating coupler is used to provide polarization optical inputs in both TM or TE mode and the polarization splitting grating coupler is used either for providing optical inputs with single polarization or detect optical outputs of the DUTs formed in the same substrate in a wafer-level testing scheme.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical tester for wafer-level verification of planarized polarization optical devices comprising:
   a plurality of planarized polarization optical devices fabricated in a wafer substrate;
   a polarization diverse grating coupler (PDGC) formed on a planar layer of the wafer substrate per each pair of the plurality of planarized polarization optical devices, the polarization diverse grating coupler comprising:
      an array of scattering elements arranged in a portion of the planar layer at a plurality of intersections of a first set of concentric elliptical curves crossing with a second set of concentric elliptical curves rotated proximately 180 degrees to form a two-dimensional (2D) grating;
      a first waveguide coupled from the first convex side of the 2D grating to a first output port; and
      a second waveguide coupled from the second convex side of the 2D grating to a second output port, the second output port being orientated proximately 180 degrees relative to the first output port;
      wherein each of the first waveguide and the second waveguide is characterized by a double-taper shape;
   a light comprising a fiber array, each of the fiber array being configured to provide a testing light illuminating the 2D grating from atop to generate a parallel-polarized light in TE mode via the first output port to test a first one of the pair of the plurality of planarized polarization optical devices and simultaneously an orthogonal-polarized light in TM mode via the second output port to test a second one of the pair of the plurality of planarized polarization optical devices.

2. The optical tester of claim 1, wherein the wafer substrate is an SOI substrate and the planar layer comprises silicon.

3. The optical tester of claim 2, wherein each scattering element is a hole of any shape into the planar layer.

4. The optical tester of claim 2, wherein each scattering element is a pillar of any shape above the planar layer.

5. The optical tester of claim 1, wherein the first/second set of the concentric elliptical curves comprise multiple sections of vertical or close to vertical ellipses having a first/second pitch configured as a first/second grating period of the 2D grating configured to receive an incident light from an optical fiber above the planar layer.

6. The optical tester of claim 5, wherein each of the first waveguide and the second waveguide in double-taper shape comprises a first taper section with a reducing first width from the first convex side to a first joint over a first length along a first bisector of the first taper section and a second taper section with a reducing second width from the first joint to the first output port over a second length along a second bisector of the second taper section, wherein the double-taper shape is optimized in terms of achieving a minimum insertion loss of transmitting a parallel polarization component and an orthogonal polarization component of the incident light with an incident angle deviated from 90 degrees relative to the planar layer respectively to the first output port and the second output port.

7. The optical tester of claim 6, wherein the double-taper shape of the first waveguide and the first grating period are optimized in terms of achieving a minimum insertion loss of transmitting a parallel polarization component of the incident light with an incident angle deviated slightly from 90 degrees relative to the planar layer to the first output port.

8. The optical tester of claim 7, wherein the double-taper shape of the second waveguide and the second grating period are optimized in terms of achieving a minimum insertion loss of transmitting an orthogonal polarization component of the incident light with an incident angle deviated from 90 degrees relative to the planar layer to the second output port.

9. The optical tester of claim 8, wherein the parallel polarization component is configured to be outputted as a polarized light in transverse magnetic (TM) mode at the first output port located at a farther focal point of the first set of concentric elliptical curves.

10. The optical tester of claim 9, wherein the orthogonal polarization component is configured to be outputted as a polarized light in transverse electric (TE) mode at the second output port located at a closer focal point of the second set of concentric elliptical curves.

11. The optical tester of claim 1 wherein each of the plurality of planarized polarization optical devices comprises a polarization de-multiplexer.

12. The optical tester of claim 1 further comprises a plurality of first single-polarizing grating couplers configured to collect polarization light signals in TE mode outputted from some of the plurality of planarized polarization optical devices receiving the polarization light from some of the first output ports of some PDGCs and a plurality of second single-polarizing grating couplers configured to collect polarization light signals in TM mode outputted from some of the second output ports of some PDGCs.

13. The optical tester of claim 1 wherein the fiber array is configured to perform optical alignment of all fibers therein simultaneously.

14. A method for performing wafer-level optical verification comprising:
   providing an array of photonics chip devices on a substrate;
   forming an array of surface grating couplers on the substrate, each surface grating coupler comprising:
      an array of scattering elements arranged in a portion of the substrate at a plurality of intersections of a first set of concentric elliptical curves crossing with a second set of concentric elliptical curves rotated proximately 90 or 180 degrees to form a two-dimensional (2D) grating;
      a first waveguide coupled from the first convex side of the 2D grating to a first output port; and
      a second waveguide coupled from the second convex side of the 2D grating to a second output port, the second output port being orientated proximately 90 or 180 degrees relative to the first output port;
      wherein each of the first waveguide and the second waveguide is characterized by a double-taper shape;
   coupling the first output port and the second output port respectively to one or more of waveguide input/output ports of at least one of the array of photonics chip devices;
   providing an array of optical fibers on top of the substrate with corresponding fiber output/input ports, each fiber being configured to deliver an incoming light from atop to each 2D grating; and
   performing measurement of at least some of the array of photonics chip devices or some outputs of at least one of the array of photonics chip devices simultaneously.

15. The method of claim 14, wherein performing an optical alignment simultaneously to the array of optical fibers with an incident angle deviated from 90 degrees relative to the substrate.

16. The method of claim 14, wherein the array of photonics chip devices comprises at least a first polarization DeMux and a second polarization DeMux, wherein forming the array of surface grating couplers comprises forming at least one polarization diverse grating coupler having an array of scattering elements arranged in a portion of the substrate at a plurality of intersections of a first set of concentric elliptical curves crossing with a second set of concentric elliptical curves rotated proximately 180 degrees as a two-dimensional (2D) grating with the first waveguide and the second waveguide formed in the substrate, providing a polarization light in TM mode from the first output port to an input of the first polarization DeMux, and providing a polarization light in TE mode from the second output port to an input of the second polarization DeMux.

17. The method of claim 16, wherein forming the array of surface grating couplers further comprises forming at least two polarization splitting grating couplers each having an array of scattering elements arranged in a portion of the substrate at a plurality of intersections of a first set of concentric elliptical curves crossing with a second set of concentric elliptical curves rotated proximately 90 degrees to form a two-dimensional (2D) grating with the first waveguide and the second waveguide formed in the substrate, coupling the first output ports of the at least two polarization splitting grating couplers to respectively detect a bar-output polarization light in TM mode and a cross-output polarization light in TM mode from the first polarization DeMux, and coupling the second output ports of the at least two polarization splitting grating couplers to respectively detect a bar-output polarization light in TE mode and a cross-output polarization light in TE mode from the second polarization DeMux.

18. The method of claim 14, further comprising:
adding a 2×2 beam splitter to an input port of a first one of the array of photonics chip devices and a 2×2 beam combiner to an output port thereof;
coupling the first output port of a first one of the array of surface grating couplers to one of two input ports of the 2×2 beam splitter;
coupling the first output port of a second one of the array of surface grating grating couplers to one of two output ports of the 2×2 beam combiner;
wherein the first one and the second one of the array of surface grating couplers are configured to provide single polarization grating added as a second input/output for characterization and performance verification of the first one of the array of photonics chip devices.

19. The method of claim 14, wherein each of the array of photonics chip devices comprises an integrated photonics module including multiple modulators, a polarization Mux, a polarization DeMux, and a functional optical component, the method further comprising:
integrating a monitor photodiode to each of the multiple modulators, the polarization Mux, the polarization DeMux, and the functional optical component of one integrated photonics module in the array;
coupling a single polarization light from one of the array of optical fibers through one of the array of surface grating couplers as an extra input to each of the multiple modulators, the polarization Mux, the polarization DeMux, and the functional optical component of the one integrated photonics module in the array;
performing testing of each integrated photonics module in the array in the same substrate simultaneously.

20. The method of claim 19, wherein integrating a monitor photodiode comprises integrating an array of monitor photodiodes respectively sensitive to optical signals in multiple wavelength windows; coupling a single polarization light comprises using a tunable laser to provide multiple optical signals with peak wavelengths respectively in the multiple wavelength windows via one of the array of optical fibers through one of array of surface grating couplers to perform multi-channel testing of each integrated photonics module in the array in the same substrate under a wafer-level optical verification setup thereof.

* * * * *